(12) United States Patent
Pujol et al.

(10) Patent No.: US 8,079,329 B1
(45) Date of Patent: Dec. 20, 2011

(54) HANDS FREE LEASH APPARATUS

(76) Inventors: Alfredo Pujol, Miramar, FL (US);
Rosanna Reynoso, Miramar, FL (US)

( * ) Notice: Subject to any disclaimer, the term of this patent is extended or adjusted under 35 U.S.C. 154(b) by 71 days.

(21) Appl. No.: 12/774,185

(22) Filed: May 5, 2010

(51) Int. Cl.
*A01K 27/00* (2006.01)
*B65H 75/34* (2006.01)

(52) U.S. Cl. ........................................................ 119/796

(58) Field of Classification Search .................. 119/769, 119/772, 774, 776, 792, 795–798
See application file for complete search history.

(56) References Cited

U.S. PATENT DOCUMENTS

| 214,823 | A | * | 4/1879 | Hopkins | 224/218 |
| D33,980 | S | * | 1/1901 | Mitchell | D3/230 |
| 1,382,446 | A | * | 6/1921 | Warren | 2/311 |
| 3,199,754 | A | * | 8/1965 | Sorensen | 224/222 |
| 5,103,771 | A | * | 4/1992 | Lee | 119/776 |
| D337,395 | S | | 7/1993 | Erlinger et al. | |
| 5,839,394 | A | | 11/1998 | Dickison | |
| 6,095,093 | A | | 8/2000 | Kisko et al. | |
| 6,227,424 | B1 | * | 5/2001 | Roegner | 224/219 |
| 6,368,262 | B1 | * | 4/2002 | Willoughby et al. | 482/148 |
| 6,553,944 | B1 | | 4/2003 | Allen et al. | |
| 7,461,615 | B2 | * | 12/2008 | Albright | 119/794 |
| 2008/0000432 | A1 | * | 1/2008 | Alhegelan | 119/796 |
| 2008/0072844 | A1 | * | 3/2008 | Konigsberg | 119/770 |
| 2008/0141950 | A1 | | 6/2008 | Glazer | |
| 2009/0235873 | A1 | * | 9/2009 | Gould et al. | 119/770 |

* cited by examiner

*Primary Examiner* — Rob Swiatek
*Assistant Examiner* — Ebony Evans
(74) *Attorney, Agent, or Firm* — Crossley Patent Law; Mark A. Crossley

(57) ABSTRACT

The hands free leash apparatus provides a leash cord that is detachable from the case that is worn as chosen on an animal controller via the strap. The second embodiment features a leash cord that is retractably extended from within the case, with lock and lock release to determine an animal's distance from the case, up to 20 feet. The v-shaped grip is removably inserted within the inset of the case so that a user can choose to omit the grip by choice. The reduced width of the strap importantly allows for the reduced width to be removably inserted into the strap's opposite end strap slot 52 without undue strap width surrounding a controller's arm, for example. The pocket with flap provides for a controller to carry such items as a cell phone or medial player, hands free.

8 Claims, 3 Drawing Sheets

HANDS FREE LEASH APPARATUS

BACKGROUND OF THE INVENTION

Having to hold onto a leash while walking an animal is often inconvenient. And, in some cases, maintaining a grip on a leash when walking a strong animal may not be possible. Additionally, it is often desirable to provide various optional distances from the animal. While some devices provide an elastic leash, such a feature does not positively control an animal's distance from the controller. The present apparatus provides an optionally hands free leash that can be removably worn on an upper or lower arm or even a clothing item. The apparatus also provides a self-locking feature for exactly controlling an animal's distance from a controller.

FIELD OF THE INVENTION

The hands free leash apparatus relates to animal leashes and more especially to a hands free leash apparatus that also provides an adjustable locking length strap.

SUMMARY OF THE INVENTION

The general purpose of the hands free leash apparatus, described subsequently in greater detail, is to provide a hands free leash apparatus which has many novel features that result in an improved hands free leash apparatus which is not anticipated, rendered obvious, suggested, or even implied by prior art, either alone or in combination thereof.

To attain this, the hands free leash apparatus provides several features not heretofore provided by a leash device. First, the apparatus, in one embodiment, provides a leash that is detachable from the case that is worn as chosen on an animal controller. Of note is that the case with detachable strap can be attached to a controller as chosen and also to a chosen object. The second embodiment features a leash cord that is retractably extended from within the case, with lock and lock release to determine an animal's distance from the case, up to 20 feet.

The v-shaped grip is removably inserted within the inset of the case so that a user can choose to omit the grip by choice. The reduced width of the strap importantly allows for the reduced width to be removably inserted into the strap's opposite end strap slot 52 without undue strap width surrounding a controller's arm, for example. The pocket with flap importantly provides for a controller to carry such items as a cell phone or medial player, hands free.

Thus has been broadly outlined the more important features of the improved hands free leash apparatus so that the detailed description thereof that follows may be better understood and in order that the present contribution to the art may be better appreciated.

An object of the hands free leash apparatus is to provide a hands free leash.

Another object of the hands free leash apparatus is to provide a leash with an optionally used grip.

Another object of the hands free leash apparatus is to provide for selective grip removal.

A further object of the hands free leash apparatus is to provide for adjustable leash attachment for attaching to a controller as chosen.

An added object of the hands free leash apparatus is to provide for hands free carry of small items in combination with the hands free leash.

And, an object of the hands free leash apparatus is to selectively and optionally determine the distance between animal and controller.

These together with additional objects, features and advantages of the improved hands free leash apparatus will be readily apparent to those of ordinary skill in the art upon reading the following detailed description of presently preferred, but nonetheless illustrative, embodiments of the improved hands free leash apparatus when taken in conjunction with the accompanying drawings.

In this respect, before explaining the current embodiments of the improved hands free leash apparatus in detail, it is to be understood that the hands free leash apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved hands free leash apparatus. It is therefore important that the claims be regarded as including such equivalent constructions insofar as they do not depart from the spirit and scope of the hands free leash apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the hands free leash apparatus generally designated by the reference number 10 will be described.

Figure 1:
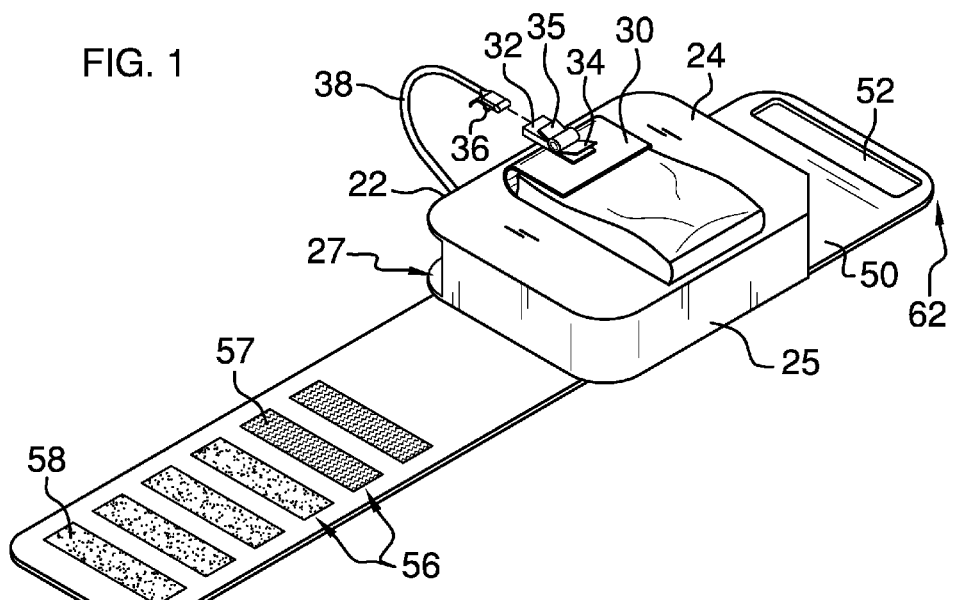
FIG. 1 is a top perspective view the first embodiment of the strap with attached case, the embodiment having a detachable cord.

Referring to FIG. 1, the first embodiment of the apparatus 10 partially comprises the case 22 having a case bottom 23 spaced apart from a case top 24 and a quartet of spaced apart sides 25. An inset 27 is disposed in one case 22 side 25. The pocket with flap 30 is disposed on the case top 24 and provides for carry of reasonably small items such as cell phones and media players. The clasp 32 is disposed on the case top 24. The manually operated first clasp release 34 is disposed on the clasp 32 and opens the pocket flap of the pocket with flap 30.

Figure 3:
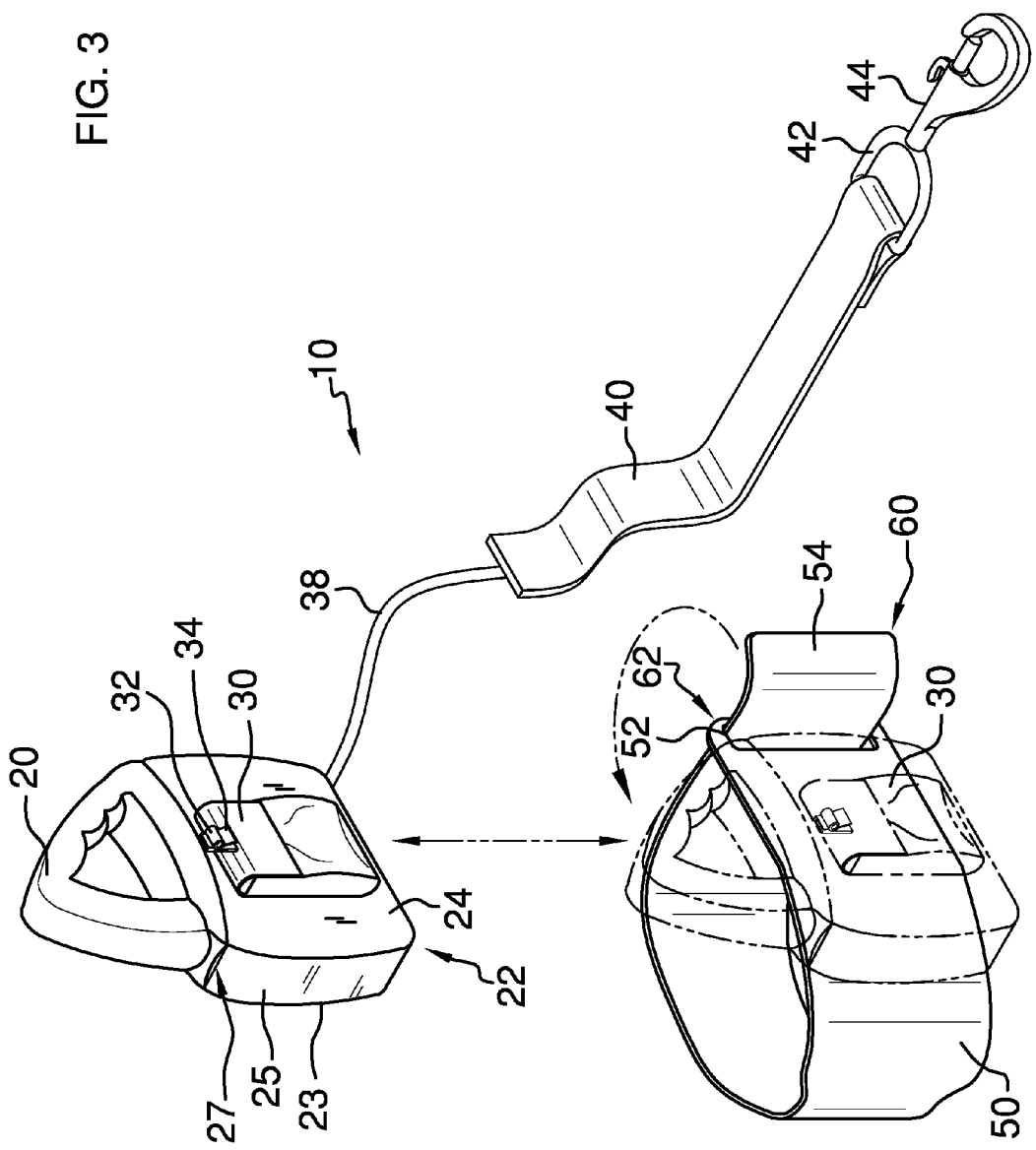
FIG. 3 is a perspective view illustrating the removable grip.

Referring to FIG. 3 and continuing to refer to FIG. 1, the strap 50 is detachably affixed to the case bottom 23. The strap 50 has a first end 60 spaced apart from a second end 62.

The reduced width 54 is disposed on the strap 50 from the case 22 to the first end 60. The strap slot 52 is disposed on the strap 50 adjacent to the second end 62. Hook and loop 56 is disposed on the reduced width 54 of the strap 50. A plurality of hook 58 of the hook and loop 56 is disposed adjacent to the strap 50 first end 60. A plurality of loop 57 of the hook and loop 56 is disposed between the hook 58 and the case 22. The v-shaped grip 20 is attached within the case 22 inset 27. The v-shaped grip 20 is optionally removably attached.

Referring again to FIG. 1, the clasp insert 36 is removably disposed within the clasp 32. The clasp insert 36 is selectively released by the second clasp release 35. The cord 38 is affixed to the claps insert 36.

Referring to FIG. 3, the attachment strap 40 is disposed on the cord 38 end opposite the clasp insert 36. In both embodiments of the apparatus 10, the d-ring 42 is disposed on the attachment strap 40, and the hook 44 is disposed on the d-ring 42.

Figure 2:
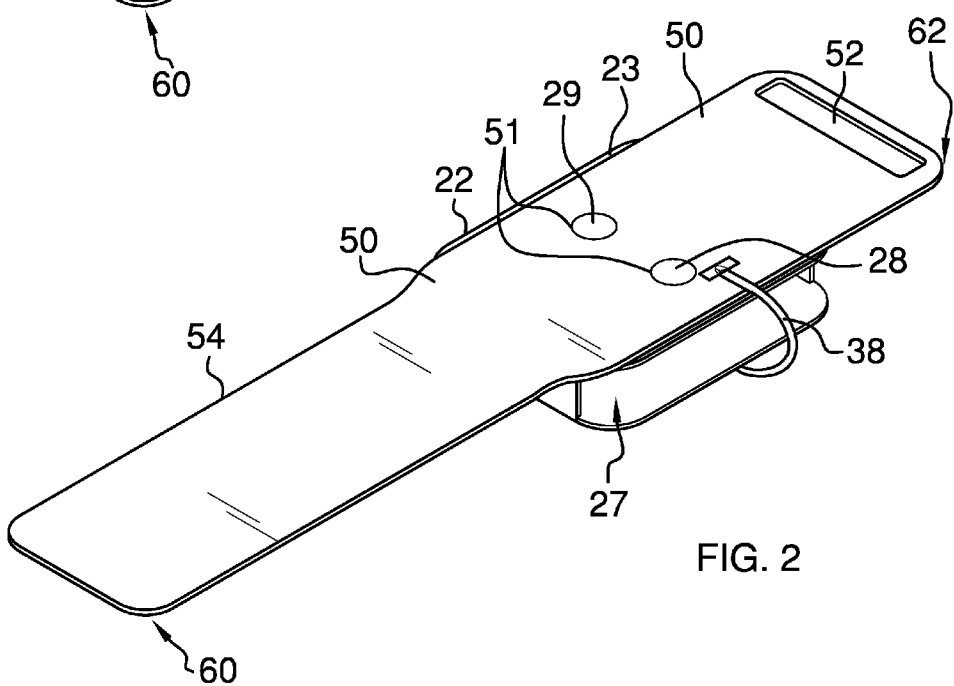
FIG. 2 is a bottom perspective view of the second embodiment of the strap with case, the embodiment having a retractable, non-removable cord.

Referring again to FIG. 3 and also to FIG. 2, the second embodiment of the apparatus 10 features the cord 38 retractably fitted within the case 22. A pair of spaced apart orifices 51 is disposed within the strap 50 under the case bottom 23. The lock button 28 is disposed within the case bottom 23. The lock button 28 is accessible through one of the pair of strap 50 orifices 51. The retractable cord 38 is locked by the lock button 28 at a chosen length from the case 22 so that a controller can determine an animal's distance from the case 22 and hence the controller or object that the case 22 might be attached to via the strap 50. The lock release button 29 is disposed within the case bottom 23. The lock release button 29 is accessible through one of the pair of strap 50 orifices 51. The cord 38 is unlocked by the lock release button 29 to extend to a chosen length from the case 22. The chosen length can be up to 20 feet.

Figure 4:
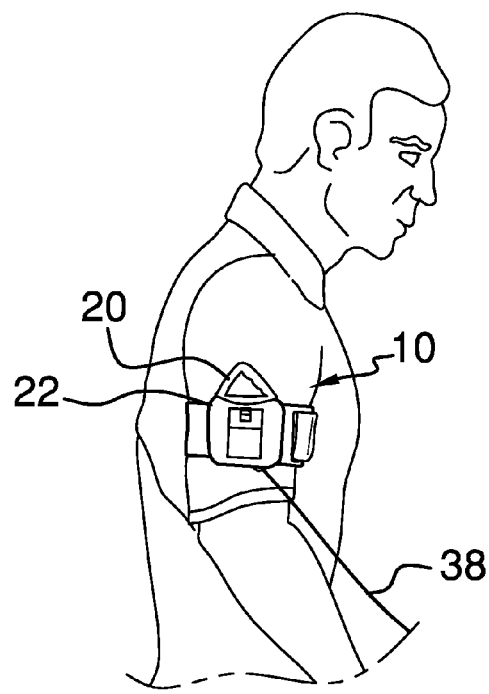
FIG. 4 is a lateral elevation view of the second embodiment of the case strapped to a user's upper arm.

Referring to FIG. 4 the strap 50 with case 22 and v-shaped grip 20 is worn on a controller's upper arm.

Figure 5:
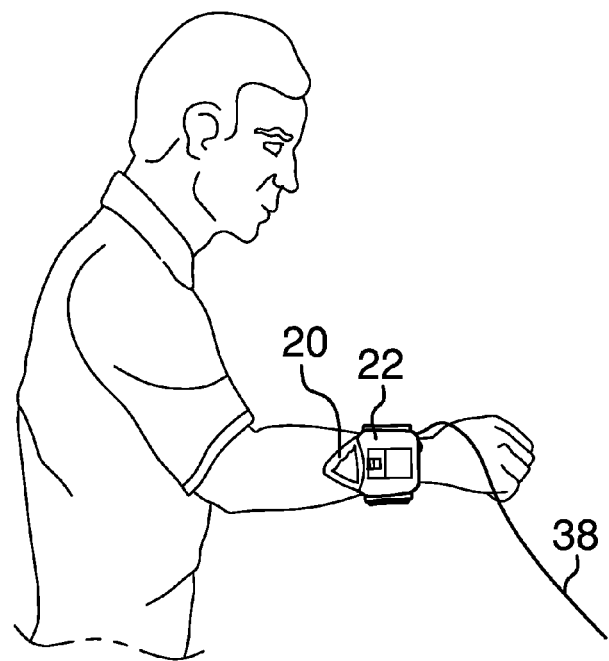
FIG. 5 is a lateral elevation view of the second embodiment of the case strapped to a user's forearm.

Referring to FIG. 5, the strap 50 with case 22 and v-shaped grip 20 is worn on a controller's forearm.

With respect to the above description then, it is to be realized that the optimum dimensional relationships for the parts of the hands free leash apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the hands free leash apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the hands free leash apparatus may be used.

Therefore, the foregoing is considered as illustrative only of the principles of the hands free leash apparatus. Further, since numerous modifications and changes will readily occur to those skilled in the art, it is not desired to limit the hands free leash apparatus to the exact construction and operation shown and described, and accordingly, all suitable modifications and equivalents may be resorted to, falling within the scope of the hands free leash apparatus.

What is claimed is:

1. A hands free leash apparatus comprising, in combination:
    a case having a case bottom spaced apart from a case top and a quartet of spaced apart sides;
    an inset disposed in one case side;
    a v-shaped grip attached within the case inset;
    a pocket with flap disposed on the case top;
    a first clasp release disposed on a clasp disposed on the case top, whereby the flap is opened;
    a strap affixed to the case bottom, the strap having a first end spaced apart from a second end;
    a reduced width disposed on the strap from the case to the first end;
    a strap slot disposed on the strap adjacent to the second end, the strap slot in removable receipt of the strap reduced width;
    a hook and loop disposed on the reduced width, a plurality of hooks of the hook and loop disposed adjacent to the strap first end, a plurality of loops of the hook and loop disposed between the hook and the case;
    a pair of spaced apart orifices disposed within the strap under the case bottom;
    a retractable cord extended from the case;
    a lock button disposed within the case bottom, the lock button accessible through one of the pair of strap orifices;
    whereby the retractable cord is locked by the lock button at a chosen length from the case;
    a lock release button disposed within the case bottom, the lock release button accessible through one of the pair of strap orifices;
    whereby the cord is unlocked by the lock release button to extend to a chosen length from the case, the chosen length up to 20 feet;
    an attachment strap disposed on a cord end opposite the case;
    a d-ring disposed on the attachment strap;
    a hook disposed on the d-ring.

2. The apparatus according to claim 1 wherein the case bottom is further detachably affixed to the strap.

3. The apparatus according to claim 2 wherein the v-shaped grip attached within the case inset is further removably attached.

4. The apparatus according to claim 1 wherein the v-shaped grip attached within the case inset is further removably attached.

5. A hands free leash apparatus comprising, in combination:
    a case having a case bottom spaced apart from a case top and a quartet of spaced apart sides;
    an inset disposed in one case side;
    a v-shaped grip attached within the case inset;
    a pocket with flap disposed on the case top;
    a clasp disposed on the case top and the pocket with flap, the clasp having a first clasp release and a second clasp release, the pocket flap opened by the first clasp release;
    a strap affixed to the case bottom, the strap having a first end spaced apart from a second end;
    a reduced width disposed on the strap from the case to the first end;
    a strap slot disposed on the strap adjacent to the second end;
    a hook and loop disposed on the reduced width, a plurality of hooks of the hook and loop disposed adjacent to the strap first end, a plurality of loops of the hook and loop disposed between the hook and the case;
    a clasp insert removably disposed within the clasp, the clasp insert selectively released by the second clasp release;
    a cord affixed to the claps insert;
    an attachment strap disposed on a cord end opposite the clasp insert;
    a d-ring disposed on the attachment strap;
    a hook disposed on the d-ring.

6. The apparatus according to claim 5 wherein the case bottom is further detachably affixed to the strap.

7. The apparatus according to claim 6 wherein the v-shaped grip attached within the case inset is further removably attached.

8. The apparatus according to claim 5 wherein the v-shaped grip attached within the case inset is further removably attached.

* * * * *